US00RE35583E

United States Patent [19]

Hamada et al.

[11] E Patent Number: Re. 35,583

[45] Reissued Date of Patent: Aug. 12, 1997

[54] CAMERA CAPABLE OF CORRECTING BLURRING

[75] Inventors: Masataka Hamada; Hiroshi Ootsuka; Hisayuki Masumoto; Tougo Teramoto, all of Osaka, Japan

[73] Assignee: Minolta Camera Kabushiki Kaisha, Osaka, Japan

[21] Appl. No.: 439,183

[22] Filed: May 11, 1995

Related U.S. Patent Documents

Reissue of:

[64] Patent No.: 5,210,563
Issued: May 11, 1993
Appl. No.: 758,309
Filed: Aug. 28, 1991

U.S. Applications:

[63] Continuation of Ser. No. 618,961, Nov. 28, 1990, abandoned

[30] Foreign Application Priority Data

| | | | |
|---|---|---|---|
| Nov. 29, 1989 | [JP] | Japan | 1-312028 |
| Nov. 29, 1989 | [JP] | Japan | 1-312029 |
| Nov. 29, 1989 | [JP] | Japan | 1-312030 |

[51] Int. Cl.[6] ..... G03B 13/18

[52] U.S. Cl. ..... 396/55; 348/208

[58] Field of Search ..... 354/400, 430, 354/202, 70; 348/208

[56] References Cited

U.S. PATENT DOCUMENTS 4,448,510 5/1984 Murakoshi ..... 354/289.12

FOREIGN PATENT DOCUMENTS 65-053524 3/1988 Japan .
1-130125 5/1989 Japan .
1-130126 5/1989 Japan .

*Primary Examiner*—David M. Gray
*Attorney, Agent, or Firm*—Burns, Doane, Swecker & Mathis, LLP

[57] ABSTRACT

A camera capable of blurring correction includes an acceleration sensor detecting camera-shake amount, and a blurring correcting device correcting blurring of image on the basis of the sensor output. When a lens of the camera is driven for automatic focusing, the blurring is not corrected using an output of the acceleration sensor. Accordingly, blurring is not wrongly corrected.

46 Claims, 14 Drawing Sheets

CAMERA CAPABLE OF CORRECTING BLURRING

Matter enclosed in heavy brackets [ ] appears in the original patent but forms no part of this reissue specification; matter printed in italics indicates the additions made by reissue.

This application is a continuation of application Ser. No. 07/618,961, filed Nov. 28, 1990, now abandoned.

BACKGROUND OF THE INVENTION

Field of the Invention

The present invention relates to cameras capable of correcting blurring occurring due to camera movement or camera-shake (hereinafter referred to as blurring), and particularly to cameras capable of blurring correction which can perform automatic focusing control (hereinafter referred to as AF).

Description of the Related Art

Cameras capable of correcting blurring have been proposed recently. As a camera-shake sensor in a camera capable of blurring correction, one which employs an angular velocity sensor is possible. The blurring correction is performed by detecting camera-shake amount of a camera employing an angular velocity sensor and driving a lens to correct it.

Recent cameras have an AF function. In a camera having an AF function, a lens is automatically driven for focusing on an object. Then, acceleration noise is produced in the camera-shake detecting sensor due to vibration of the motor and vibration of the driving mechanism. It was then recognized that the blur is not properly corrected because correct angular velocity outputs cannot be obtained accordingly.

Furthermore, in a camera capable of blurring correction, the blurring amount of image of an object to be photographed on film is corrected in exposure of the film. In order to correct the blurring amount of the object on the film, a blurring amount correcting lens provided in a group of lenses is driven at a speed necessary for correction.

In a camera capable of hand-shake correction, the hand-shake is corrected as described above. As compared to the performance of the blurring correcting means, however, the speed required for correction of a correcting lens for hand-shake correction is sometimes too fast for correction, or sometimes the amount to be corrected is so large that the correction is made insufficiently. In these cases, even with a camera having correcting means, there is a problem that the hand-shake cannot be sufficiently corrected, so that blurring exists in a picture.

In addition, cameras capable of flashlight emission and blurring correction have been proposed recently. Only one power source place generally exists in a camera, so that boosting for flash and driving of blurring detecting sensors are generally performed using a single power source in a camera capable of flashlight emission and blurring correction.

When a flash circuit is boosted by a power source, the voltage of a battery is likely to fluctuate, so that a problem might occur that the data provided by a shake detecting sensor such as angular velocity sensor is not correct due to the influence.

SUMMARY OF THE INVENTION

Accordingly, it is an abject of the present invention to perform blurring correction correctly in a camera capable of detection of camera-shake.

It is another object of the present invention to perform blurring correction as much as possible in a camera capable of detection of camera-shake.

The above objects of the present invention are attained by a camera capable of camera-shake detection including the following elements. That is, a camera according to the present invention includes a camera-shake amount detecting sensor for detecting a camera-shake amount of said camera, a blurring corrector for correcting blurring of said camera on the basis of said camera-shake amount, a focus adjusting optical system for focusing on an object image, a driver for driving the optical system, and a controller for controlling the driver and the blurring corrector so that the blurring corrector does not use outputs of the camera-shake detecting sensor when the optical system is being driven.

In the period in which vibration noises are produced because the optical system is driven, the blurring correcting device does not use outputs of the camera-shake detecting sensor. Accordingly, wrong detection of blurring amounts is avoided. As a result, in a camera capable of camera-shake detection, correct blurring correction is possible.

Preferably, a camera according to the present invention includes an exposure amount controller for controlling exposure to film, a camera-shake detecting sensor for detecting said camera-shake amount, a blurring corrector for correcting image blurring caused by the camera-shake in response to an output of the camera-shake detecting sensor, a determining device for determining whether the camera-shake can be properly corrected or not, an auxiliary light means for lighting the object, and a controller for making the auxiliary lightening device emit light when the determining device determines that the camera-shake cannot be properly corrected in the exposure.

Generally, a blurring amount is expressed as a product of exposure time and blurring velocity. When the above-identified exposure time or blurring velocity exceeds a correctable amount, the determination device determines that blurring correction is impossible. In this case, the blurring amount can be reduced by reducing the exposure time. If the exposure time is reduced at that time, however, the exposure amount decreases. Therefore, in the present invention, flashlight is emitted to compensate for the insufficient exposure amount due to the decrease in exposure time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
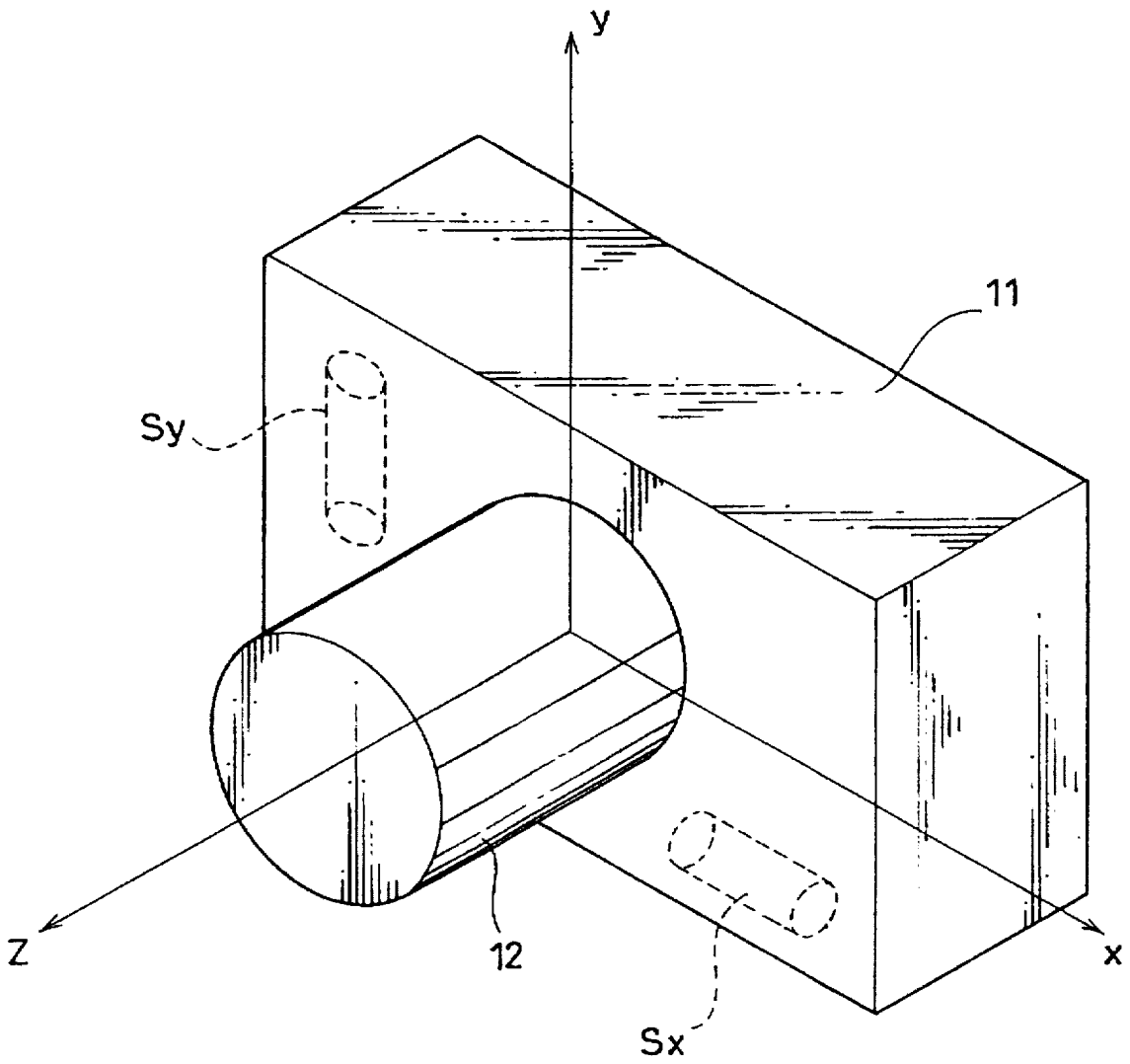
FIG. 1 is a perspective view of a camera to which the present invention is applied.

FIG. 1 is a perspective view conceptually showing the structure of a camera as one embodiment of the present invention. In a camera body 11, angular velocity sensors Sx and Sy for detecting angular velocities in a longitudinal shake direction and a lateral shake direction, respectively, are provided in a plane (the x-y plane in the figure) vertical to an optical axis (the z axis in the figure) of a taking lens 12.

Figure 2:
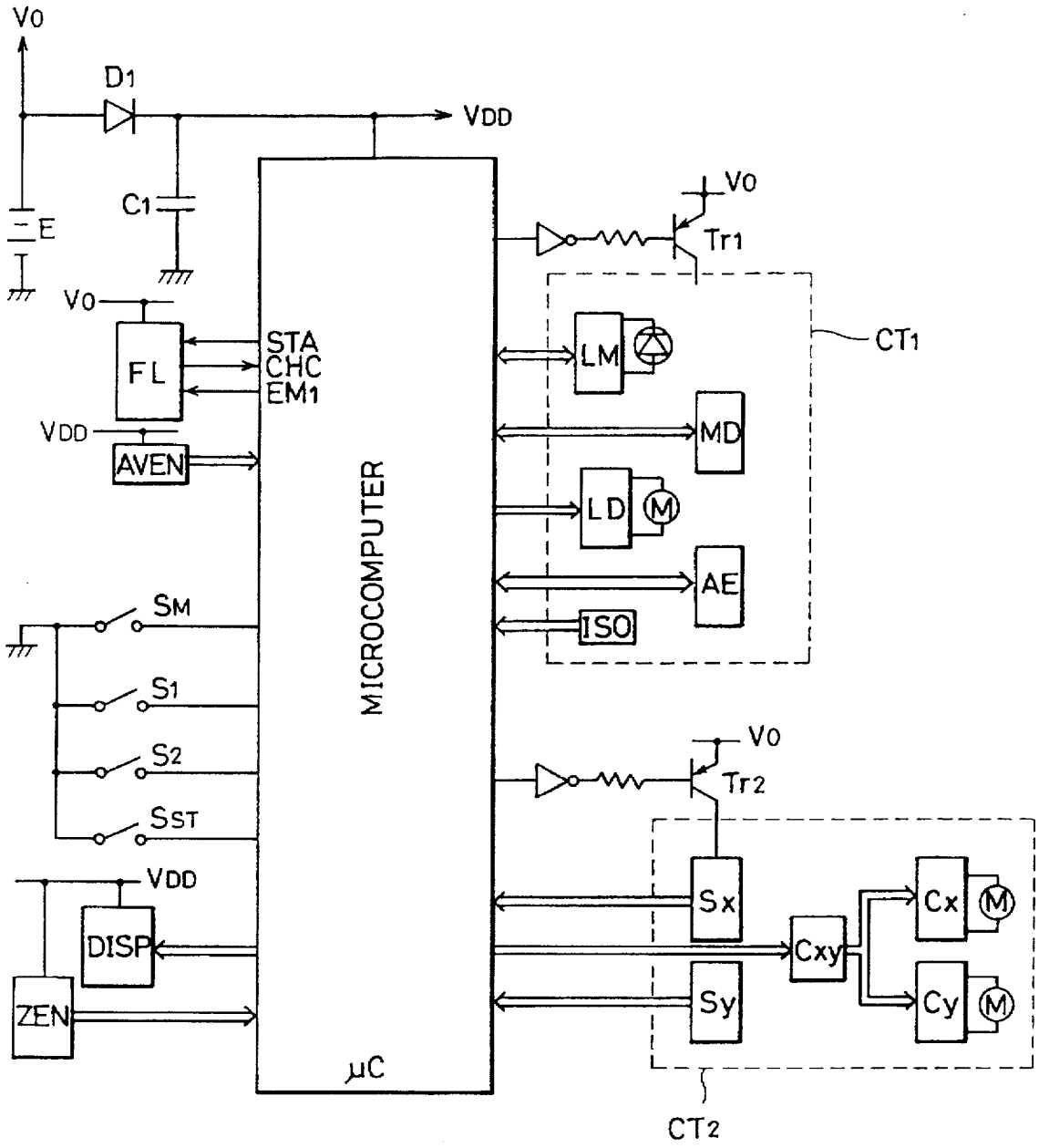
FIG. 2 is a block circuit diagram of the camera shown in FIG. 1.

FIG. 2 is a block circuit diagram showing portions related to control of the camera shown in FIG. 1. Referring to FIG. 2, the camera according to the present invention includes a microcomputer μC administrating sequence control of the entire camera, exposure calculation and exposure control. To the microcomputer μC, peripheral circuits $CT_1$ and $CT_2$ which will be described in detail later, some switches for controlling operation of the camera, and a power source for supplying power to the microcomputer and the peripheral circuits $CT_1$ and $CT_2$ are connected.

Peripheral circuit $CT_1$ includes a light measuring circuit LM for measuring brightness of an object, converting the same into a digital signal and transmitting the same to the microcomputer μC, a distance measuring circuit MD for convening an analogue signal indicating the distance supplied from a distance detecting circuit into a digital signal and supplying the same to the microcomputer μC, a lens driving circuit LD for driving a lens for focus adjustment on the basis of the distance obtained according to the data of the distance measuring circuit MD, an exposure control circuit AE having a shutter also used for an aperture for controlling the shutter on the basis of the shutter speed determined on the basis of output of the light measuring circuit LM and also automatically controlling the aperture, and a film sensitivity reading circuit ISO for reading film sensitivity Sv recorded on a film chamber and transmitting the same to the microcomputer μC.

Peripheral circuit $CT_2$ includes angular velocity sensors Sx and Sy for detecting angular velocities in a longitudinal shake direction and a lateral shake direction of the camera and transmitting the camera-shake amount to the microcomputer μC, and a blurring correcting lens control circuit Cxy for driving a lens LC in a plane vertical to the optical axis for correcting blurring which is caused by the camera shake. The shake of the camera is corrected by the blurring correcting lens control circuit Cxy supplying as an output a correction signal to the correcting lens driving circuits Cx and Cy.

The microcomputer μC further includes a display circuit DISP for warning blurring, a zoom encoder ZEN for transmitting a focal length of taking lens 12 which is a zoom lens to the micro computer μC, a flash circuit FL for emitting a flash light and an aperture encoder AVEN for transmitting an aperture value to the microcomputer μC.

Next, switches will be described. Switches connected to the microcomputer μC include a main switch SM which has an ON state for driving a camera and an OFF state for keeping a camera standing still, a preparatory switch S1 which is turned on upon a first stroke of a release button (not shown), a release switch S2 which is turned on upon a second stroke of the release button, and an exposure starting switch SST which is turned on when the shutter starts operating to start exposure. When preparatory switch S1 is turned on, preparatory operation such as the light measuring operation, distance measuring are performed. When the release switch S2 is turned on, exposure control is performed.

next, portions related to a power source will be described. A direct output voltage Vo of power source battery E is supplied to peripheral circuits $CT_1$ and $CT_2$ through a flash circuit FL and first and second feeding transistors Tr1 and Tr2, respectively. A capacitor C1 for back-up is charged by the power source battery E through a diode D1 for reverse current prevention. A charging voltage $V_{DD}$ of capacitor C1 for back-up is supplied to the microcomputer μC, the display circuit DISP sad the zoom encoder ZEN, the aperture encoder AVEN. The above-described peripheral circuits $CT_1$, $CT_2$ include circuits of large power consumption, so that the voltage of power source battery E may temporarily decrease when it is being driven. Even in the voltage decrease time, the microcomputer μC is supplied with power from capacitor C1 for back-up, so that it operates properly.

Now, the description about a hardware configuration of the embodiment is completed. Next, the soft wear configuration of the present embodiment will be described.

Figure 3:
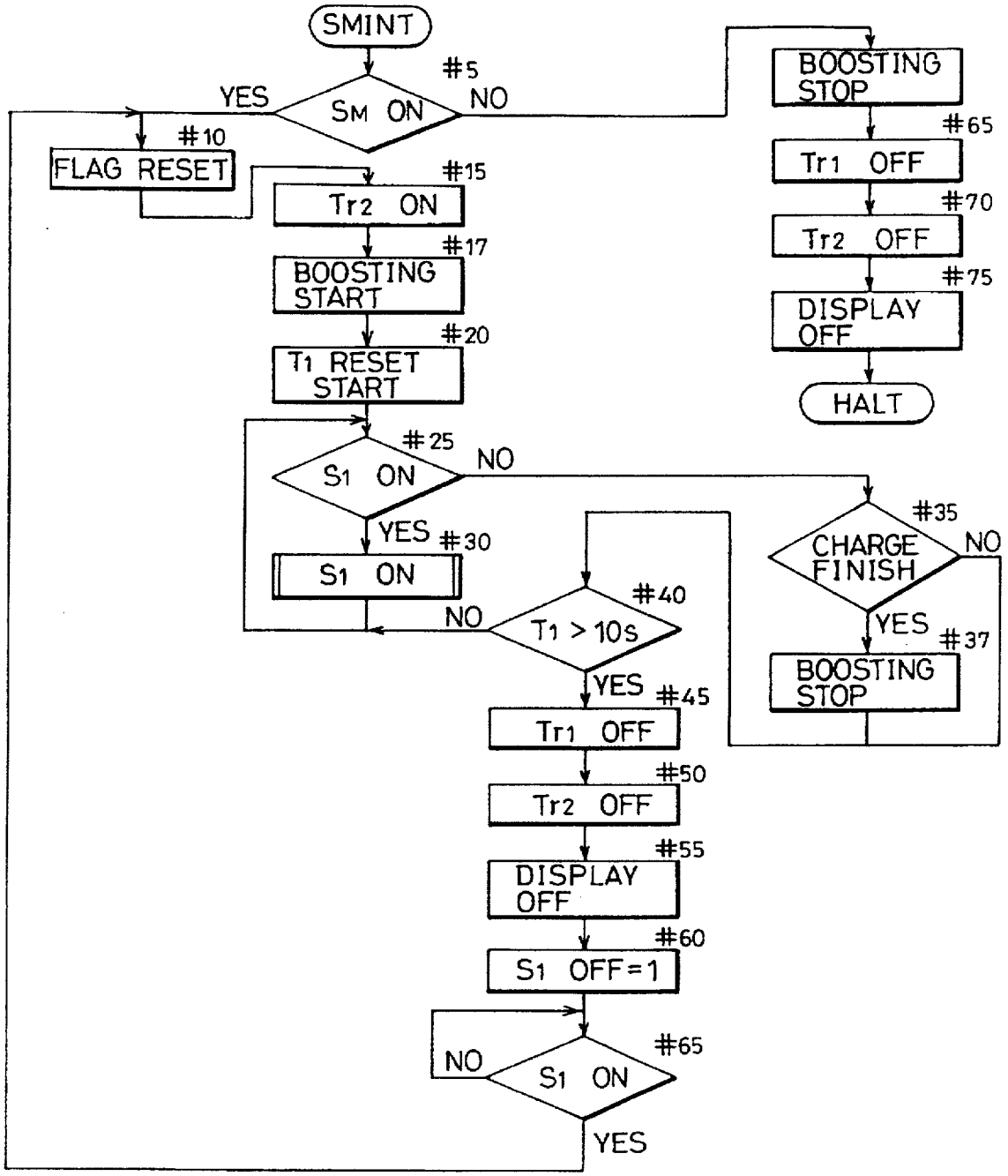
FIGS. 3–6 and 10 are flow charts showing operation of the camera according to the present invention.

FIG. 3 is a flow chart showing contents of an interruption SMINT carried out when the main switch SM is operated to be switched from OFF to ON or from ON to OFF. If this interruption SMINT is produced, it is determined first as to whether the main switch SM is ON or not (#5). If the main switch SM is OFF, it is determined that the main switch SM is operated from ON to OFF. As a result, boosting of flash circuit FL is stopped, the first feeding transistor Tr1 is turned off, and power supply to the first peripheral circuit $CT_1$ including light measuring circuit LM and so forth is stopped. Next, the second feeding transistor Tr2 is turned off, and power supplying to the second peripheral circuit $CT_2$ including angular velocity sensors Sx and Sy is stopped. The display is eliminated and the microcomputer μC attains a half state (#65–#75). If the main switch SM is ON in step #5, all the flags are reset and boosting of the flash circuit is started to start charging a capacitor (not shown) of flash circuit FL. Next, the feeding transistor Tr2 is turned on to start supplying power to the second peripheral circuit $CT_2$ including angular velocity sensors Sx and Sy, and a timer $T_1$ is reset and started (#10–#20). The timer $T_1$ is a holding timer for holding power supplying to peripheral circuits $CT_1$ and $CT_2$. Next, a determination is made as to whether preparatory switch S1 is ON or not in the step #25, and if it is ON, the subroutine of S1 ON is carried out in step #30 and the program returns to step #25.

Figures 4, 5:
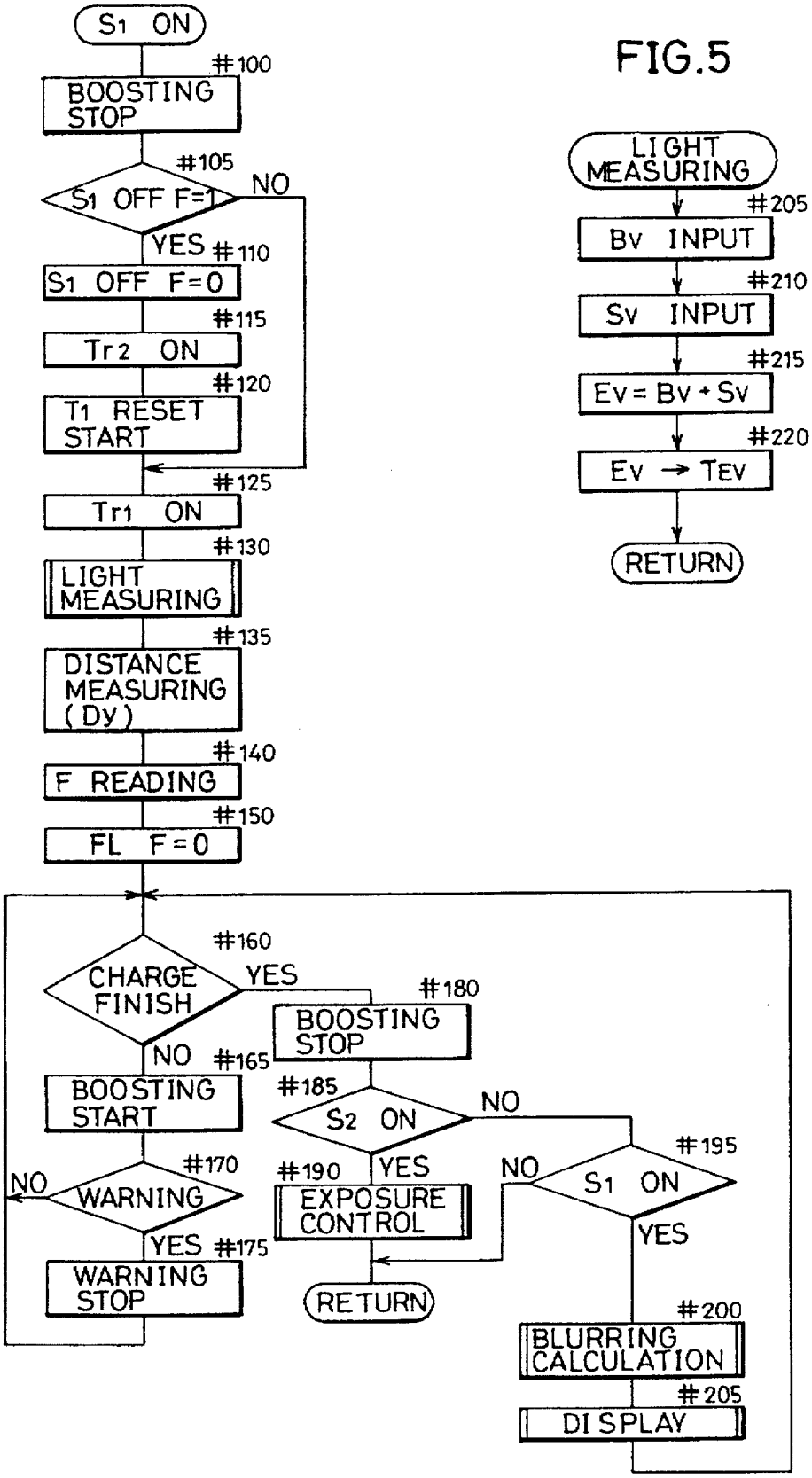

FIG. 4 is a flow chart showing the subroutine of the above-described S1 ON. When the preparatory switch S1 is turned on, boosting of flash circuit FL is stopped (#100). Switch S1 is turned off sad a determination is made as to whether a flag SI OFF F indicating that a hold time (10s) has passed is set or not (#105), and if it is set, it is reset, transistor Tr2 is turned on, and power supply holding timer $T_1$ is reset-started and the program advances to step #125 (#110–#120).

If the flag S1 OFF F is not set step #105, the program immediately advances to step #125, transistor Tr1 is turned on to supply power to peripheral circuit $CT_1$ and light measuring data and distance measuring data are inputted (#125–#135).

Next, referring to FIG. 5, a subroutine of the light measuring shown in step #130 of FIG. 4, will be described.

A brightness value Bv is read from light measuring circuit LM, and the film sensitivity Sv is read from film sensitivity reading circuit ISO. An exposure time $T_{EV}$ is found from the exposure value EV obtained as exposure value EV=BV+Sv, and the program returns (#205–#220).

Referring to FIG. 4 again, next, a focal length F is read from zoom encoder ZEN (#140), a flag FLF indicating flash light emission is rest (#150), and it is detected whether a flash circuit FL has been charged or not (#160). If charging of the flash circuit FL is not completed (when the potential of a terminal CHC shown in FIG. 2 is H, "H" corresponds to high level whereas "L" corresponds to low level hereinafter), the program advances to step #165, and boosting of flash circuit FL is started. Specifically, the potential of a terminal STA is made H (#165). Next, if warning of blurring is made in step #170, a warning display of camera-shake is eliminated and the program returns to step #160 (#170, #175). Here, the warning display is eliminated when flash circuit FL is boosted because the blurring amount is not calculated in boosting in which the voltage of the battery is very likely to fluctuate and the data indicating the blur amount is not precise. When charging of flash circuit FL is completed in step #160 (when the potential of a terminal CHC is L), boosting of flash circuit FL is stopped (the potential of the terminal FTA is made L) and a determination is made as to whether release switch S2 is turned on or not (#180, #185). If release switch S2 is ON, exposure is controlled, and the program returns (#185, #190). If switch S2 is not ON in step #185, a determination is made as to whether switch S1 is ON or not, and if switch S1 is OFF, the program returns (#195). When switch S1 is ON in step #195, the blurring amount is calculated and displayed, and program returns to step #160 (#195–#205).

Figure 6:
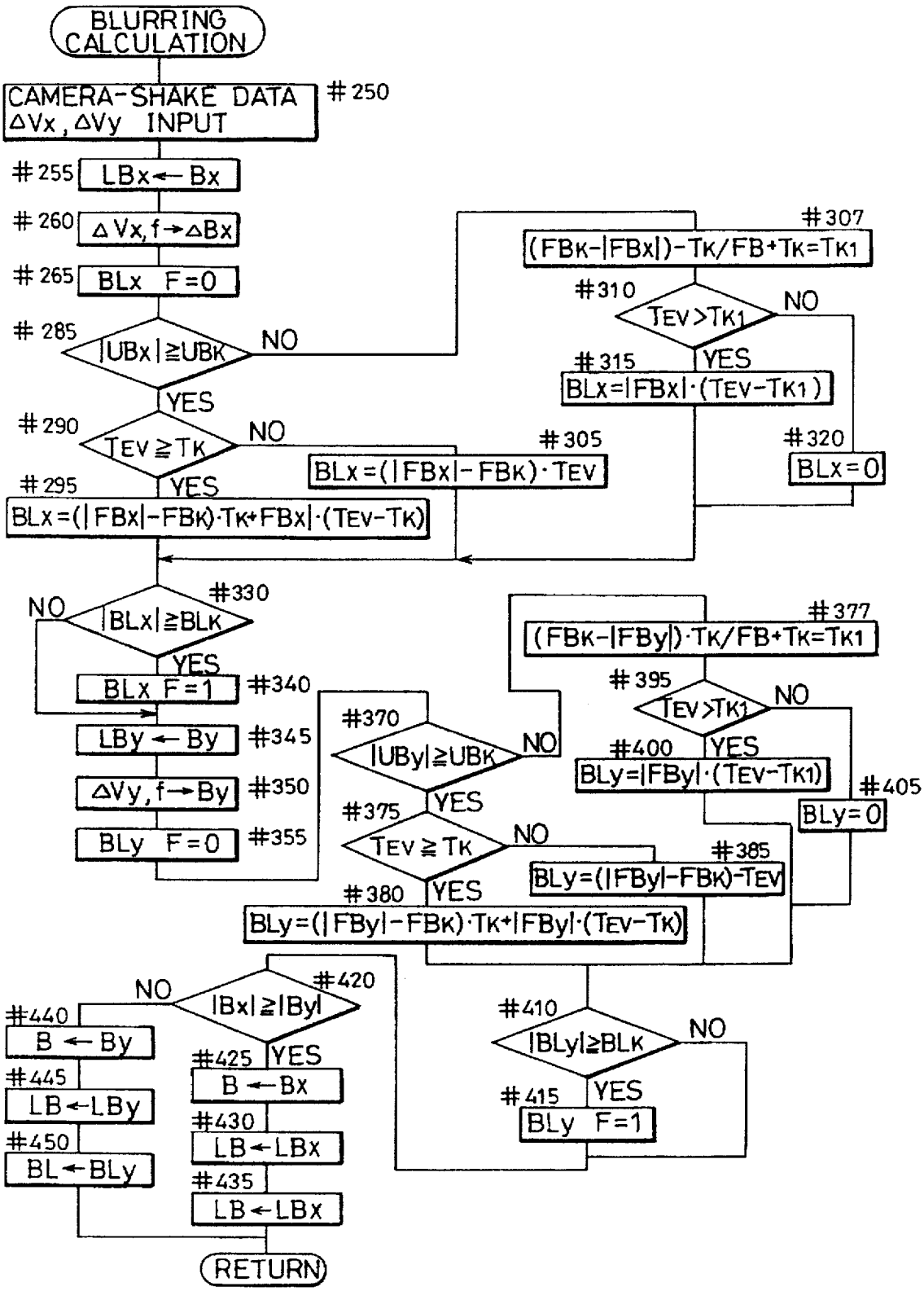

Referring to FIG. 6, a subroutine of blurring amount calculation shown in step #200 of FIG. 4 will be described. First, angular velocities (shake data) ΔVx and ΔVy are supplied from angular velocity sensors Sx and Sy, respectively (#250). Assuming that the preceding angular velocity Bx is LBx, finding an angular velocity ΔBx in the x direction on the image surface according to the focal length f, a flag BLx flag indicating that the angular velocity (blurring amount) in the x direction is large is reset (#255–#265).

The angular velocity (blurring date) is found according to the focal length because the blurring amount changes with the focal length, which increases as the focal length increases.

Next, details of the blur amount calculation will be described. An angular velocity obtained from outputs from angular velocity sensors Sx and Sy (wherein the electric charge amount is converted into a voltage) is regarded as $\dot{\theta}$. Here, the camera-shake amount B detected by the angular velocity sensors Sx and Sy can be expressed as follows, $$B=\dot{\theta}$$

A blurring amount Δu in a surface equivalent to that of a film is a function of focal length f of a taking lens 12 at that time and a function of tangent of the blur angular θ. Accordingly, $$\Delta u=f\cdot \tan\theta \quad (1)$$

$$\text{Also, } \Delta u=f\cdot \tan(f\dot{\theta}dt). \quad (2)$$

Here, when an image velocity on film is FB, then $$FB=\frac{du}{dt}=\frac{d}{dt}\{f\cdot\tan(f\dot{\theta}dt)\} \quad (3)$$

The speed UB for moving a correcting lens for blurring correction has a constant relationship with blurring velocity u, and then if a constant is a, the following expression holds.

$$FB=\frac{Du}{dt}=a\frac{du}{dt}=a\cdot f\cdot\frac{d\tan(f\dot{\theta}dt)}{dt} \quad (4)$$

This Du/dt has a limitation for movement, which is expressed as $UB_K$. Then, the speed UBx at which the correcting lens is to be moved calculated from the obtained angular velocity can be expressed as follows, $$Ubx=\frac{dUx}{dt}=a\cdot f\cdot\frac{d\tan(f\dot{\theta}dt)}{dx} \quad (5)$$

In the expression, an index x indicates a value about the x direction. In step #285 of FIG. 6, determination is made as to whether the obtained speed Ubx at which a correcting lens is to be moved for blurring correction is within $UB_K$ which is a movable limitation speed or not, in other words, whether the obtained speed to be corrected is within a correctable range or not.

The speed UB at which a correcting lens is to be moved is, UB=a·FB and the following relationships hold, $$Ubx=a\cdot FBx$$

$$UBy=a\cdot FBy$$

$$UBK=a\cdot FBK$$

That is, the determination in step #285 means the same as the determination about whether $|Fbx|\geqq FB_K$ or not.

Since a blurring amount can be obtained by a product of blurring speed and blurring. It is assumed that exposure time $T_{EV}$ is generally necessary for photographing. In view of this, time usable for correction $T_K$ is examined. The time usable for correction $T_K$ is found out on the basis that the correcting lens is moved at the correctable maximum speed $UB_K$ in one direction.

Returning to step #285 of FIG. 6, when it is determined that the speed UBx at which a correcting lens is to be moved in an x direction is a correctable speed $UB_K$ or more, the program advances to step #290, where it is determined whether the exposure time $T_{EV}$ is longer than the time usable for correction $T_K$ or not.

Next, a description will be given to the uncollectable blurring amount Blx. For the correcting lens limitation speed $UB_K$ and the speed at which it is to be moved Ubx, the blurring speed on the film surface is expressed as $FB_K$ and Fbx. In this case, if exposure time $T_{EV}\geqq$time usable for correction $T_K$, uncorrectable blurring amount $Blx=(|Fbx|-FB_K)\cdot T_K+|Ubx|\cdot(T_{EV}-T_K)$, and, $$T_{EV}<T_K, \text{ then,}$$

$$Blx=(|Fbx|-FB_K)\cdot T_{EV}$$

then, the program advances to step #330.

Figure 7:
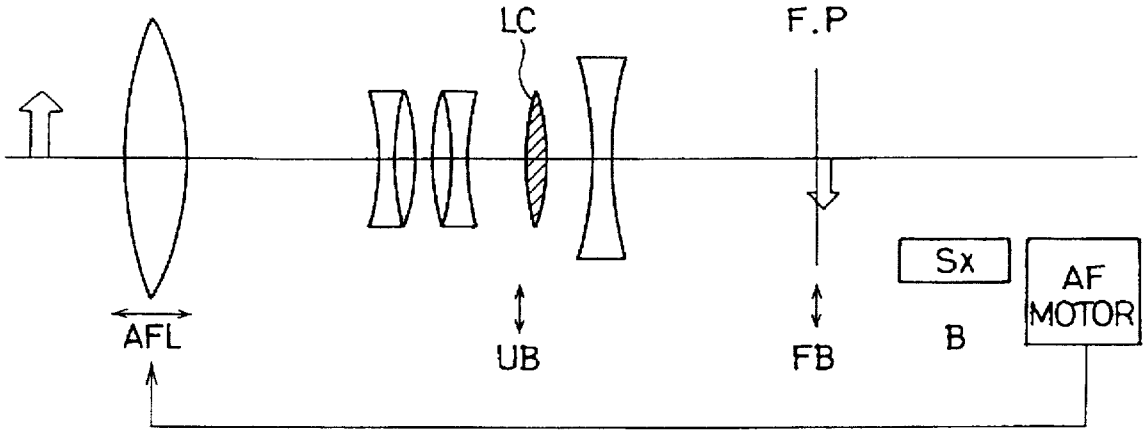
FIG. 7 is a diagram showing an optical system of a camera according to the present invention.

FIG. 7 is a diagram showing a lens optical system of a camera with blurring correction according to the present invention. Referring to FIG. 7, the optical system according to the present invention will be described. The optical system of a camera with blurring correcting according to the present invention includes an AF lens AFL driven by an AF motor for focusing, and a group of lenses including a correcting lens LC moving vertically to an optical axis for blurring correction. With an output B of an angular velocity sensor Sx (only x direction is considered here), the correcting lens LC is moved at a speed of UB in the direction designated by the arrow in the figure. When the correcting lens LC is moved at a speed UB in the direction designated by the arrow in the figure, the image on the surface of the film FP moves at a speed of FB. The motor for AF is located in the vicinity of the camera body 11 where an angular velocity sensor Sx is located rather than in the vicinity of the lens optical system.

Figure 8:
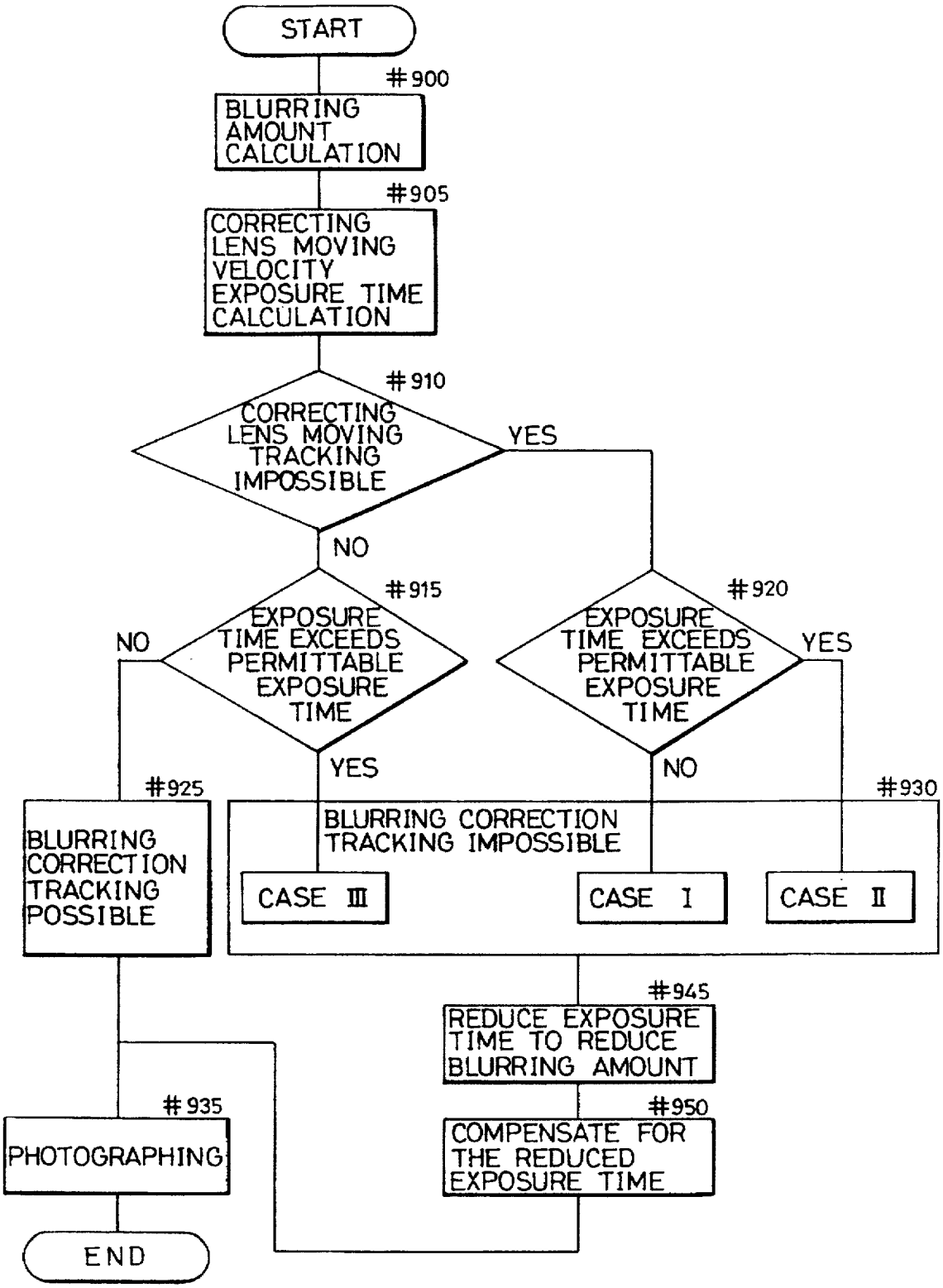
FIG. 8 is a flow chart showing main portions of the method of correcting blurring according to the present invention.

FIG. 8 is a flow chart schematically showing the method of blurring correction according to the present invention. First, a blurring amount is calculated (#900), and a moving velocity Ubx to be corrected by the correcting lens shown in FIG. 7, exposure time $T_{EV}$ and time usable for correction $T_K$ are calculated (#905). Next, on the basis of the above-described calculated results, it is determined whether the correcting lens LC is a lens movable at a speed necessary for correction or not (#910). Specifically, a determination is made as to whether the speed UB at which the correcting lens is to be moved is smaller than the limitation speed $UB_K$ of the correcting lens. If a determination is made in step #910 that the speed Ubx at which the correcting lens LC is to be moved is smaller than the limitation speed $UB_K$, the program goes to step #915, and it is determined whether the exposure time $T_{EV}$ exceeds the permittable exposure time $T_K$ or not (#915). If it is determined that the exposure time $T_{EV}$ does not exceed the exposure permittable time $T_K$ in step #915, tracking for blurring correction is possible since there is no problem in connection to the moving speed for correction of correcting lens LC and exposure time (#925). On the other hand, if the exposure time $T_{EV}$ exceeds the permittable exposure time $T_K$ in step #915, tracking for blurring correction is impossible because of a problem concerning exposure time. The case corresponds to the case III described later concerning FIG. 9C.

In the case where the speed Ubx at which the correcting lens LC moves exceeds the limitation speed $UB_K$ of the correcting lens in step #910, a determination is made as to whether the exposure time $T_{EV}$ exceeds the permittable exposure time $T_K$ or not as well as in step #915 (#920). If it is determined that the exposure time $T_K$ exceeds the permittable exposure time $T_K$ in step #920, it corresponds to the case II described concerning FIG. 9B, and if the exposure time $T_{EV}$ does not exceed the permittable exposure time $T_K$, it corresponds to the case I described concerning FIG. 9A. Anyway, in these cases, blurring correction tracking is impossible (#930).

Next, the cases where blurring correction tracking expressed in the case I-case III described above is impossible will be described.

Figure 9A:
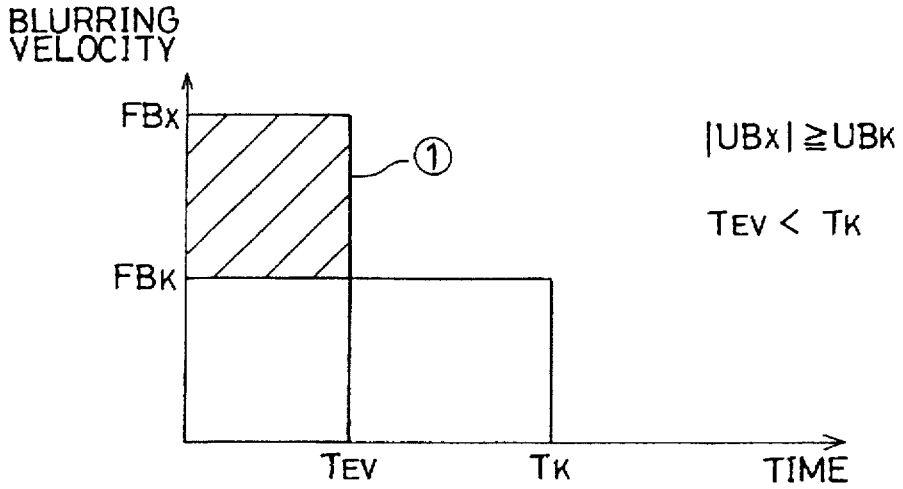
FIGS. 9A–9C are diagrams showing relationship between a blurring velocity of an image on a film surface and an exposure time.
Figure 9B:
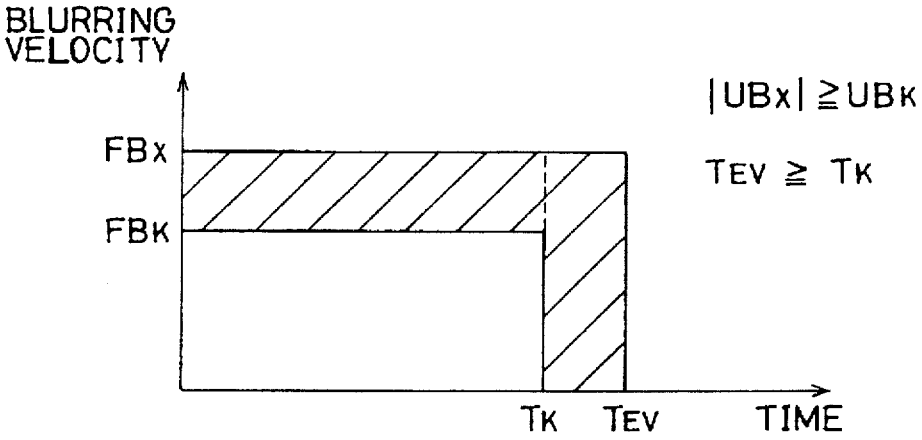
Figure 9C:
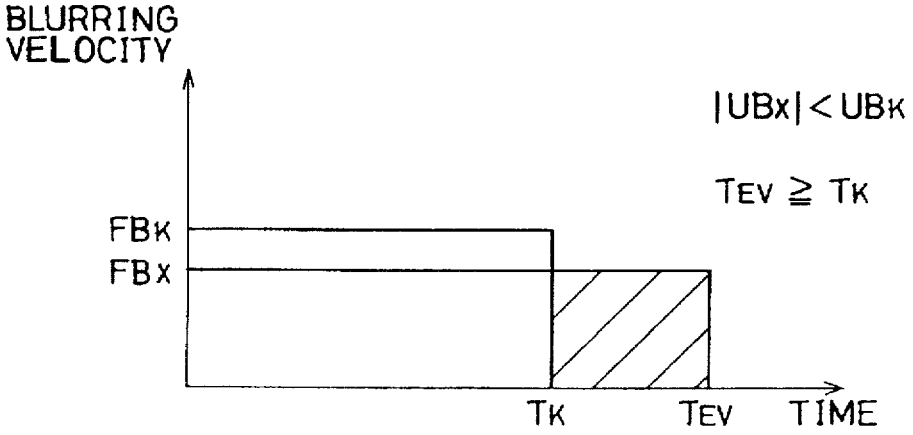

FIGS. 9A–9C are diagrams for showing blurring correction tracking impossible regions in the case corresponding to the cases I–III in which blurring correction tracking is impossible described in step #830 of FIG. 8, respectively. In each figure, in axis of abscissa indicates time and the axis of ordinate indicates the image velocity on the film surface. Accordingly, the area shown in the XY plane shows a distance, or blurring amount and so fourth.

In FIG. 9A, as described in step #930 of FIG. 8, Ubx $\geqq UB_K$, $T_{EF}<T_K$. In FIGS. 9A–9C, the blurring correction limitation speed is expressed using the image speed Fbx on the film surface and so forth but not using a moving speed Ubx of a correcting lens LC and so forth as in FIG. 8. However, since a proportional relationship exists between them as known from the relationship shown in FIG. 7, it is described using the image speed FBx on the film surface in FIGS. (9A–9C.

In FIG. 9A, as described above, the image speed Fbx on the film surface exceeds the correctable image speed |FBX| on the film surface, so that $|Fbx|-FB_K$ corresponds to a blurring amount for a unit time. By multiplying the same by the exposure time $T_{EV}$, that is, by the portion shown by the oblique lines in FIG. 9A, the blurring amount is expressed. Here, the camera-shake amount detected by the angular velocity sensor |Bx| is assumed to be constant.

FIG. 9B shows a case in which the image speed Fbx on the film surface exceeds the correctable speed $FB_K$ of the image on the film surface, and also the exposure time $T_{EV}$ exceeds the time usable for correction $T_K$. As in the case of FIG. 9A, the portion designated by oblique lines indicates the blurring amount which cannot be corrected. Accordingly, the blurring amount in this case can be obtained by adding $(|Fbx|-FB_K)\cdot T_K$ and a value obtained by multiplying time which become unusable for correction $(T_{EV}-T_K)$ and a blurring amount for a unit time Fbx, that is, $|Fox|\cdot(T_{EV}-T_K)$.

FIG. 9C shows a case where the image speed Fbx on the film surface is smaller than the correctable limit speed $FB_K$, so that blurring tracking is possible concerning the image speed on the film surface, but the exposure time $T_{EV}$ exceeds the time usable for correction $T_K$. In this case, the margin amount in the image speed on the film surface, or the margin amount for blurring expressed as $(FB_K-|Fbx|)\cdot T_K$ compensates for a part of the blurring amount on the exposure time side.

As described above, a blurring amount impossible to be corrected is calculated. The blurring amount is obtained as Blx in steps #295, #305, #315 and #320 of FIG. 6. In FIG. 6, the steps #285 through #320 are the same as the steps #910 through #930 of FIG. 8, so that the description thereof is not repeated. After those values are found out, the program advances to step #330, and a determination is made as to whether the above obtained uncorrectable blurring amount Blx exceeds the permittable blurring amount $BL_K$ (blurring, but of an amount permittable on a picture) or not. If the uncorrectable blurring amount Blx exceeds the permittable blurring amount $BL_K$, a flag BLxF is set and the program advances to step #345. On the other hand, if the value is the permittable blurring amount $PL_K$ or less, the program directly advances to step #345 (#330–#340).

In the following steps #345–#415, the blurring amount in the y direction BLy is obtained in the same manner as that in the x directions Blx as described above, so that the description thereof is not repeated.

Next, in step #420, absolute values of shake amount detected by angular velocity sensors in the x direction and the y direction are compared in magnitude. Such a comparison is made because it is sufficient to take larger one in x or y direction as a blurring amount. Accordingly, in steps #440–#450, determining that the blurring amount in the y direction is larger than the blurring amount in the x direction, the blurring amount BLy in the y direction is inserted as the blurring amount BL. On the other hand, in steps #425–#435, determining that the blurring amount Bx in the x direction is larger than the blurring amount By in the y direction, the blurring amount Blx in the x direction is inserted as the blurring amount BL, and the program returns.

Figure 10:
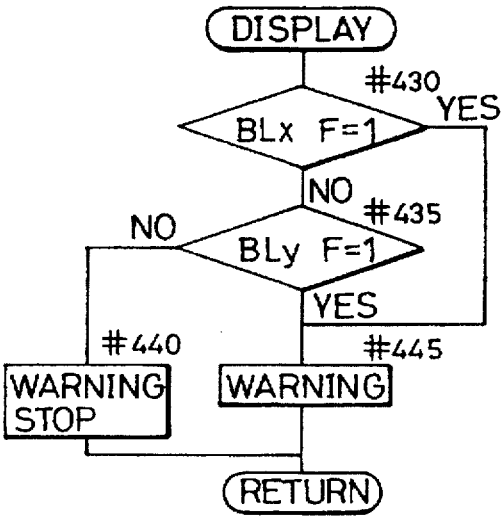

FIG. 10 shows a subroutine of display shown in step #205 of FIG. 4. Referring to FIG. 10, if either one of flags Blxf, BLyF showing that a blurring amount in the x or y direction is larger, blurring warning is made, and if non of them is set, without making blurring warning, the program returns (#430–#445).

Next, referring to FIG. 8 again, process in the cases I–III shown in FIGS. 9A–9C where blurring correction tracking is impossible will be described. Also, in such cases, some approach must be applied to reduce blurring amounts. In this invention, exposure time is reduced in order to reduce blurring amount in such cases (#945). That is to say, as shown in FIG. 9A, for example, the area designated by the oblique line portion corresponds to a blurring amount. In order to reduce the blurring amount, the area of the oblique line portion must be reduced. The blurring amount cannot be corrected, however, by reducing the magnitude of Fbx—$FB_K$ by increasing the image speed $FB_K$ on the film surface. This is because $FB_K$ is a limitation image speed on the film surface.

Accordingly, in order to reduce the area of the oblique line portion, the exposure time $T_{EV}$ should be moved toward the left side. That is, reducing an exposure time reduces a blurring amount.

Just reducing exposure time, however, cannot implement sufficient exposure amount. Accordingly, in the present invention, flash light emission is used to compensate for the reduced portion of exposure time when reducing exposure time (#950). After that, photographing is performed according to a normal routine (#935).

Figure 11A:
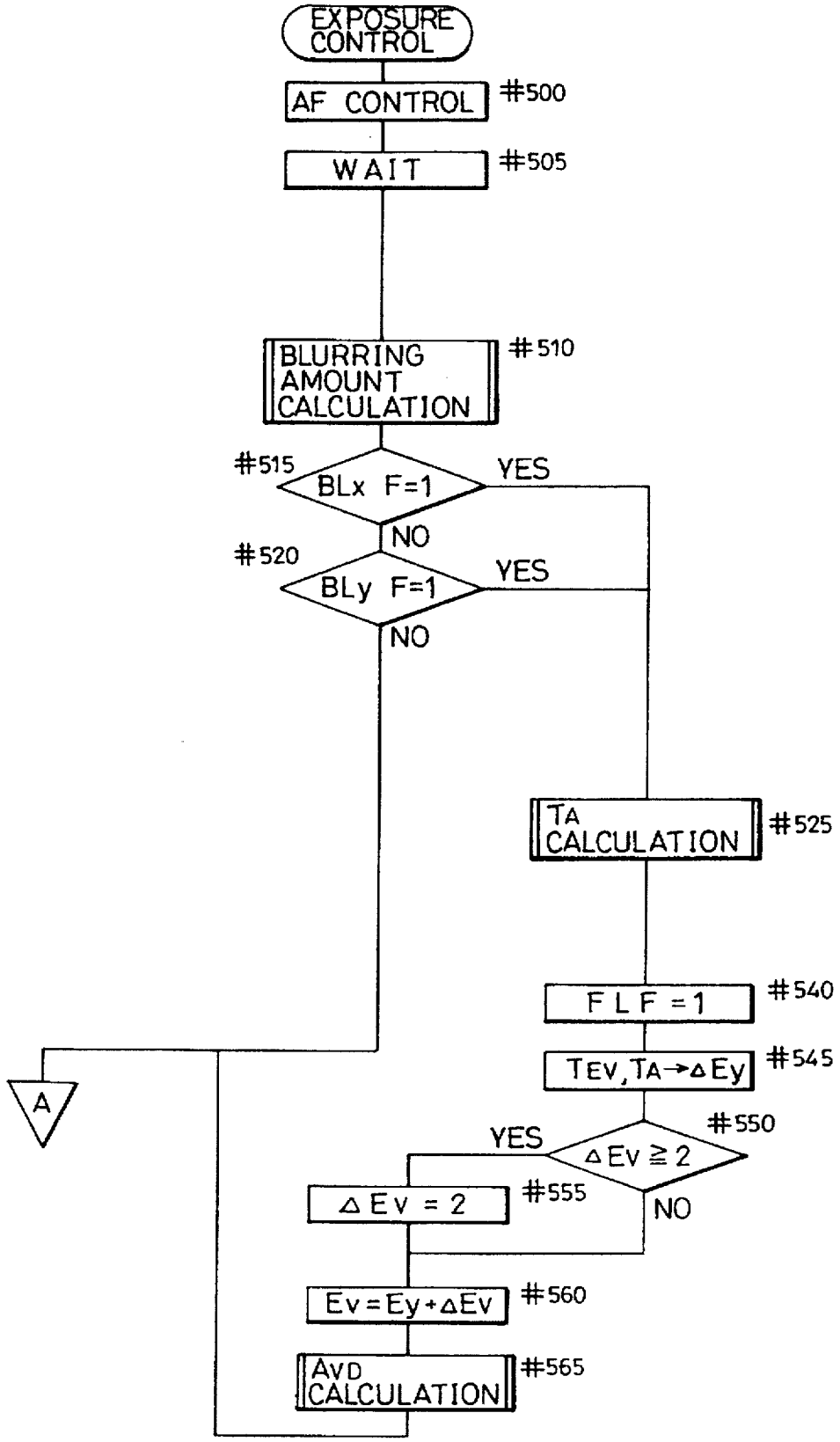
FIGS. 11A–13 are flow charts showing operation of the camera in the case where the blurring correction tracking according to the present invention is impossible.

Next, a flow of exposure control according to the idea of reducing exposure time in order to reduce blurring amount as described above will be described referring to FIGS. 11A–11C. First, in exposure control, AF control is applied (#500). After completion of the AF control, blurring amount calculation is performed (#505, #510). Blurting amount calculation (input of shake data ΔVx, ΔVy) is performed after completion of AF because of the following reasons. That is, when a lens is being driven, vibration of a motor and vibration by driving mechanism is produced. It becomes camera-shake amount (angular velocity). If blurring correction is performed based on data which is not caused by camera-shake actually produced by operation of a photographer, wrong correction is performed in exposure.

Next, a determination is made as to whether flags showing that the respective blurring amounts are large in the x and y directions are set or not, and when none of them is set, the program proceeds to step #570 (#515, #520). If either one of flags Blxf and Blyf is set, the program proceeds to step #525, to calculate exposure time TA. The exposure time TA corresponds to the exposure time reduced to reduce a blurring amount as described above, which is obtained by dividing the blurring amount exceeding the permittable amount $PL_K$ by the angular velocity at that time (a blurring amount for a unit time).

Figure 12:
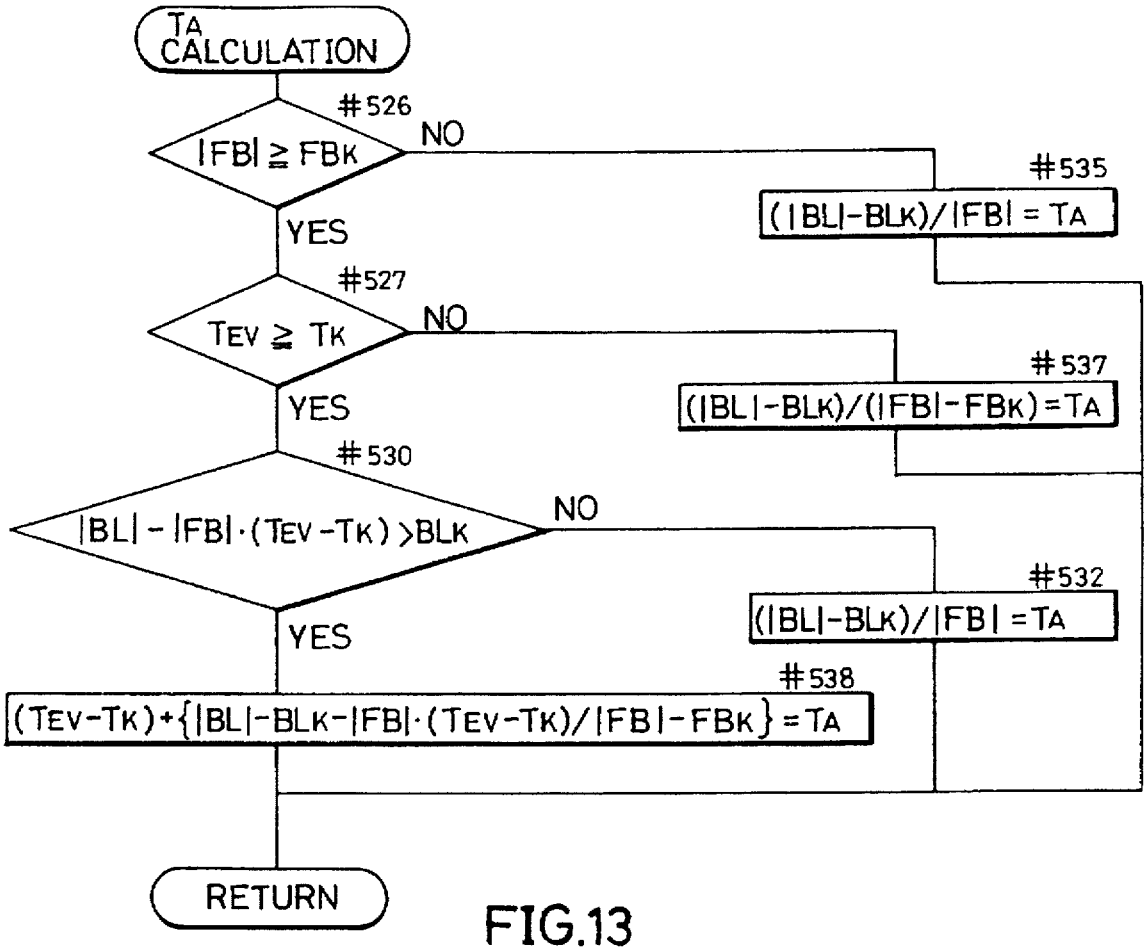

Next, a flow chart for calculating exposure time TA for reducing the blurring amount will be described referring to FIG. 12. First, it is determined whether the image speed |FB| on the film surface is not less than the predetermined limit speed $FB_K$ on the film surface or not (#526). If $|FB|<FB_K$ in step #526, the exposure time TA is found by subtracting permittable value $BL_K$ from an absolute value of the blurring amount (at this time exposure time $T_{EV}$>time usable for correction $T_K$, and $|FB|\cdot(T_{EV}-T_K)$ is blurring amount BL) and dividing the same by an image blurring amount |FB| (#535).

When the image speed |FB| on the film surface is not less than the limit speed $FB_K$ on the film surface in step #526, a determination is made about $T_{EV}\geqq T_K$. If, $T_{EV}<T_K$, an exposure time TA for reducing a blurring amount is found out by dividing $(|BL|-BL_K)$ obtained by subtracting a permittable value $BL_K$ from a blurring amount |BL|, by a value $(|FB|-FB_K)$ obtained by subtracting a correctable speed $FB_K$ from an image blurring amount |FB| (#527, #537). If $T_{EV}\geqq T_K$ in step #527, a determination is made as to whether the blurring amount on the image surface $\{|BL|-|FB|\cdot(T_{EV}-T_K)\}$ has already exceeded the permittable value $BL_K$ or not until exposure time $T_K$ (#530). If it is determined that it exceeds the permittable value $BL_K$ in step #530, the exposure should be finished before the exposure time $T_K$, and the exposure time TA is obtained by adding the time at which the blurring time until the exposure time $T_K$ $\{|BL|-BL_K-|FB|\cdot(T_{EV}-T_K)\}$ attains the permittable value and the time $T_K-T_{EV}$ together. On the other hand, if $\{|BL|-|FB|\cdot(T_{EV}-T_K)\}\leqq BL_K$ in step #530, a part of the blur amount between $T_K-T_{EV}$ should be cut, the exposure time TA is obtained by $TA=(|BL|-BL_K)/|FB|$ from $|BL|-|FB|\cdot TA=BL_K$, and the program returns after processing of step #538 or #532.

Returning to FIG. 11A, after calculating TA in step #525, as stated above, in order to reduce a blurring amount as much as possible, the exposure is set rather under and flash light is emitted to compensate for the insufficient exposure amount. Flag FLF showing this is set in step #540. An exposure correction amount ΔEv is obtained from exposure time $T_{EV}$ and TA. this is because if an exposure time $T_{EV}$ (Ev is obtained) is obtained, if the exposure time TA is found out from the relative relationship between the values, an exposure correction amount $\Delta E_V$, is automatically found (#540, #545). A determination is made as to if the exposure correction amount $\Delta E_V$ or more or not in step #550. If $\Delta E_V$ is $2E_V$ or more, in consideration of a latitude of film, $\Delta E_V$ is equal to 2, and if $\Delta E_V$ less than $2E_V$ in step #550, it advances to step #560. The exposure value $E_V$ is determined to be $E_V=E_V+\Delta E_V$, and an aperture value $A_{VD}$ when emitting flash light for obtaining a corrected exposure amount is calculated on the basis of the correction value and the program advances to step #570 (#560–#565). Although there is provided a limit of 2 in a value of $\Delta E_V$, it is desired to make a determination in step #550 with a latitude instead of 2 if the latitude can be read from a film container.

Figure 11B:
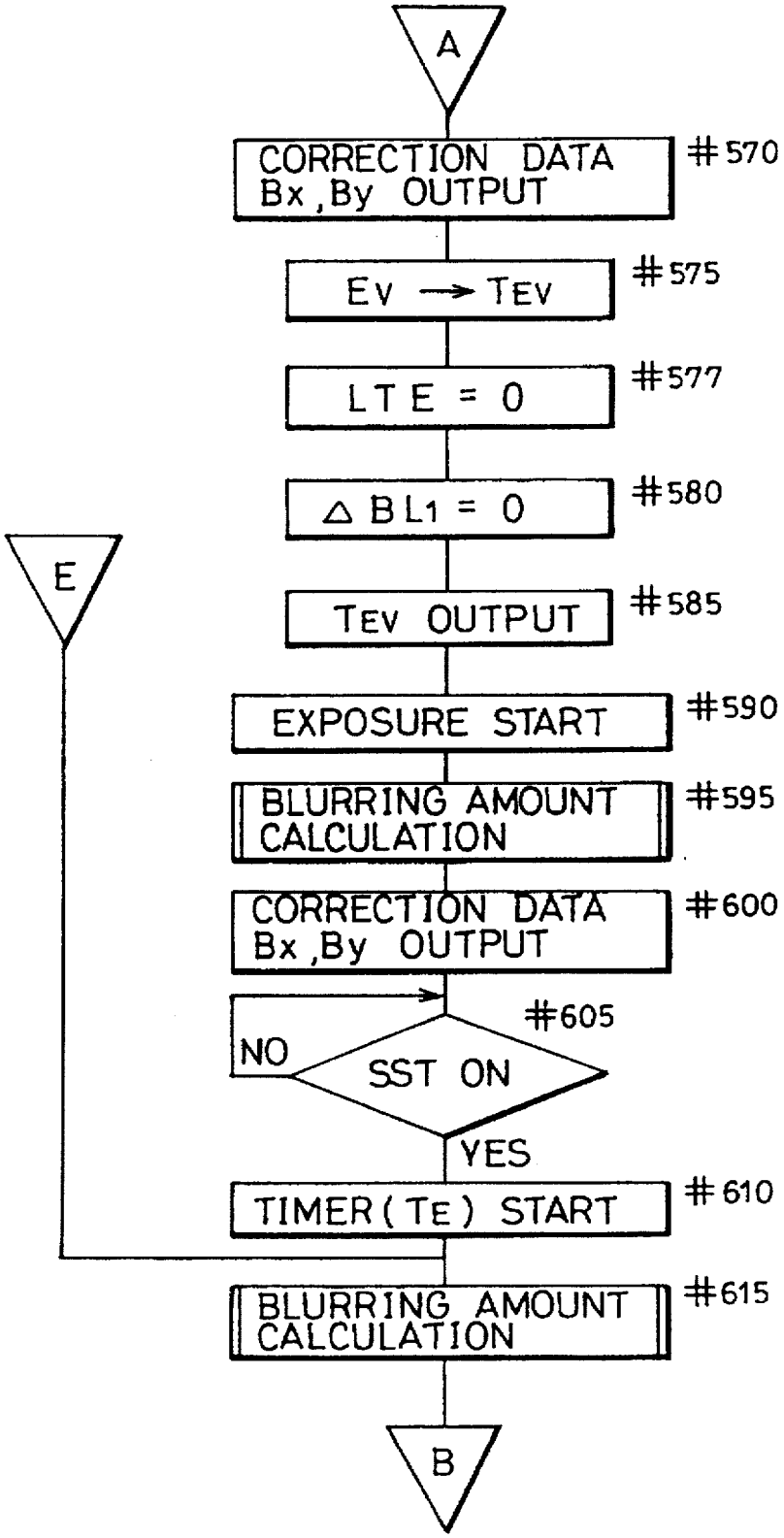
Figure 13:
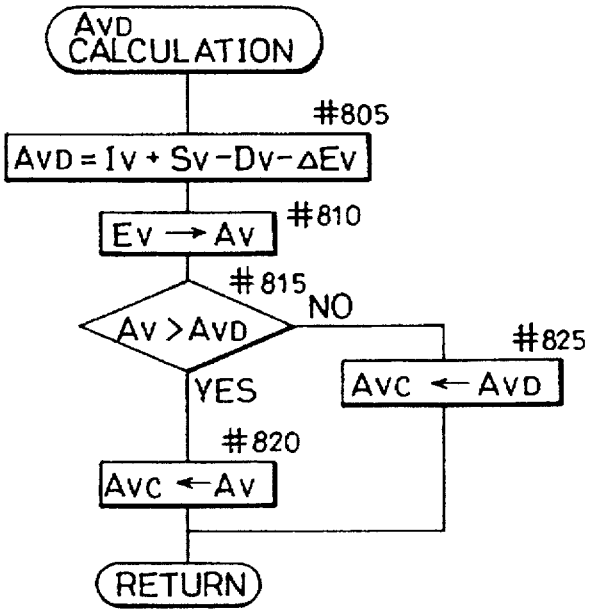

Next, the program advances to an aperture value calculating subroutine (#565), which contents will be described referring to FIG. 13. In the aperture value calculating subroutine, an aperture value $A_{VD}$ is first obtained with $I_V$ (emission amount)+SV (film sensitivity)—$D_V$ (distance)—$\Delta E_V$ (#805). Then, from the obtained exposure amount $E_V$, an aperture value at that time (since a camera to which the present invention is applied is of a shutter and aperture in one system, an aperture value can be obtained in a one-to-one manner from an exposure value as well as a shutter speed) is obtained. The aperture value AV and the aperture value $A_{VD}$ at flash light emission obtained as described are compared in magnitude (#810, #815). If $AV>A_{VD}$ in step #815, the control aperture value $A_{VC}$ is AV, and if $AV\leqq A_{VD}$), the control aperture value $A_{VC}$ is $A_{VD}$. Thus, the aperture values are made small respectively and the program returns (#815–#825). Referring to. FIG. 11B, the flow after step #570 will be described. Correction data Bx and By are supplied to a correction circuit Cxy, and an exposure time $T_{EV}$ is obtained again from the obtained exposure value $E_V$(#570, #575). In the repeated flow from exposure starting, a variable LTE showing an exposure elapsed time until the previous time is reset, a variable $\Delta BL_1$ of the blurring amount in the previous time is made 0, an exposure time $T_{EV}$ is supplied as an output to an exposure control circuit AE, and next an exposure starting signal is supplied as an output to the exposure control circuit AE (#570–#590). Thus, the exposure control mechanism operates and a shutter is driven. next, a blurring amount is calculated again, correction data Bx and By are supplied as outputs, and blurring amount correction is performed even in a release time lag period. (#595, #600). Then, starting of exposure on a film surface is detected by switching on of a switch SST, when it attains ON, timer $T_E$ showing exposure elapsed time is started, blurring amount is calculated for blurring correction again, and the correction data Bx and By are supplied as outputs (#615, #620). From step #615, depending on the exposure time $T_{EV}$ when the $T_{EV}$ is long, blurring amount is calculated a plurality of times. To obtain time $\Delta T_E$ for performing the flow once from the previous time to this time, $\Delta T_E$ is found by $T_E$—$LT_E$. An exposure time $T_E$ at this time is regarded as $LT_E$ (#625, #630). The uncorrected blur amount $\Delta BL$ produced in the time $\Delta T_E$ due to change in the blurring speed is obtained as $\Delta T_E \times (FB—FLB) \cdot ½$. Adding the blurring amount until the previous time and the blurring amount $\Delta BL$ at the present time together, a new value $\Delta BL_1$ is obtained (#650, #655). It is multiplied by ½ as $\Delta BL = \Delta T_E \times (FB—FLB) \cdot ½$ because, assuming that the change in speed gradually occurs, the blurring amount produced at that time is calculated. Next, obtaining a remaining time until completion of exposure $T_2$ by $T_{EV}$–$T_E$, a blurring amount produced in the time (uncorrectable amount) is predicted (#660). First, a determination is made as to whether the blurring speed FB on the film surface is the correctable maximum speed $FB_K$ or more or not, and if $FB \geqq FB_K$, a determination is made as to whether the exposure time $T_{EV}$ is the time usable for correction $T_K$ or more or not (#665, #670). If it is not $T_{EF} \geqq T_K$ in step #670, it is determined that a blurring prediction amount $\Delta BL_2 = (FB—FB_K) \times T_2$ (#675). If $T_{EV} \geqq T_K$ in step #670, a blurring prediction amount $\Delta BL_2 = (FB—FB_K) \cdot T_2 + FB \cdot (T_{EV}—T_K)$ and the program proceeds to step #700. If $FB < FB_K$ in step #665, $T_K1$ is obtained from $(FB_K—|FB|) \cdot T_K / FB + T_K$, it is determined whether $T_{EV} \geqq T_{K1}$ or not (#667, #685). If $T_{EV} \geqq T_{K1}$ in step #685, the blurring prediction amount $\Delta BL_2 = FB \cdot (T_{EV}—T_K)$, and if $T_{EV} < T_{K1}$, the blurring amount $\Delta BL_2 = 0$, and the program proceeds to step #700 (#685–#695).

Next, an uncorrectable blurring region till that point $|\Delta BL_1|$ and a predicted blurring amount $\Delta BL_2$ are added together to obtain $\Delta BL_3$, and it is determined whether this is a permittable predetermined value $BL_K$ or more or not (#705). $\Delta BL_3$ is obtained in this way in order to amend exposure correction when the predicted blurring amount and an actual blurring amount are different from each other, with exposure correction performed when the blurring amount is large. Then, if $\Delta BL_3 \geqq BL_K$ in step #705, the program proceeds to step #710, and if $\Delta BL_3 < \Delta BL_K$, the program proceeds to step #795.

Figure 11C:
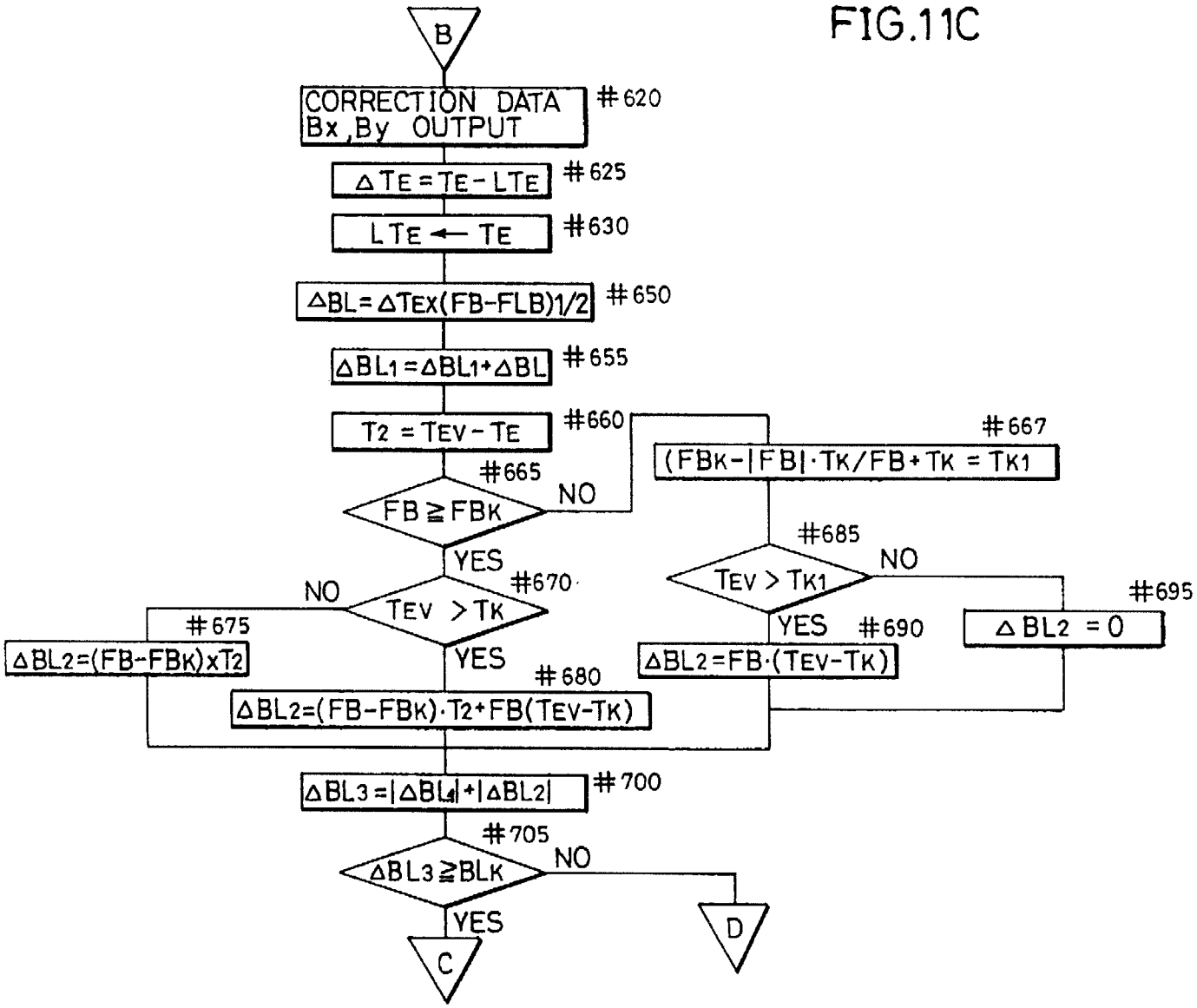
Figure 11D:
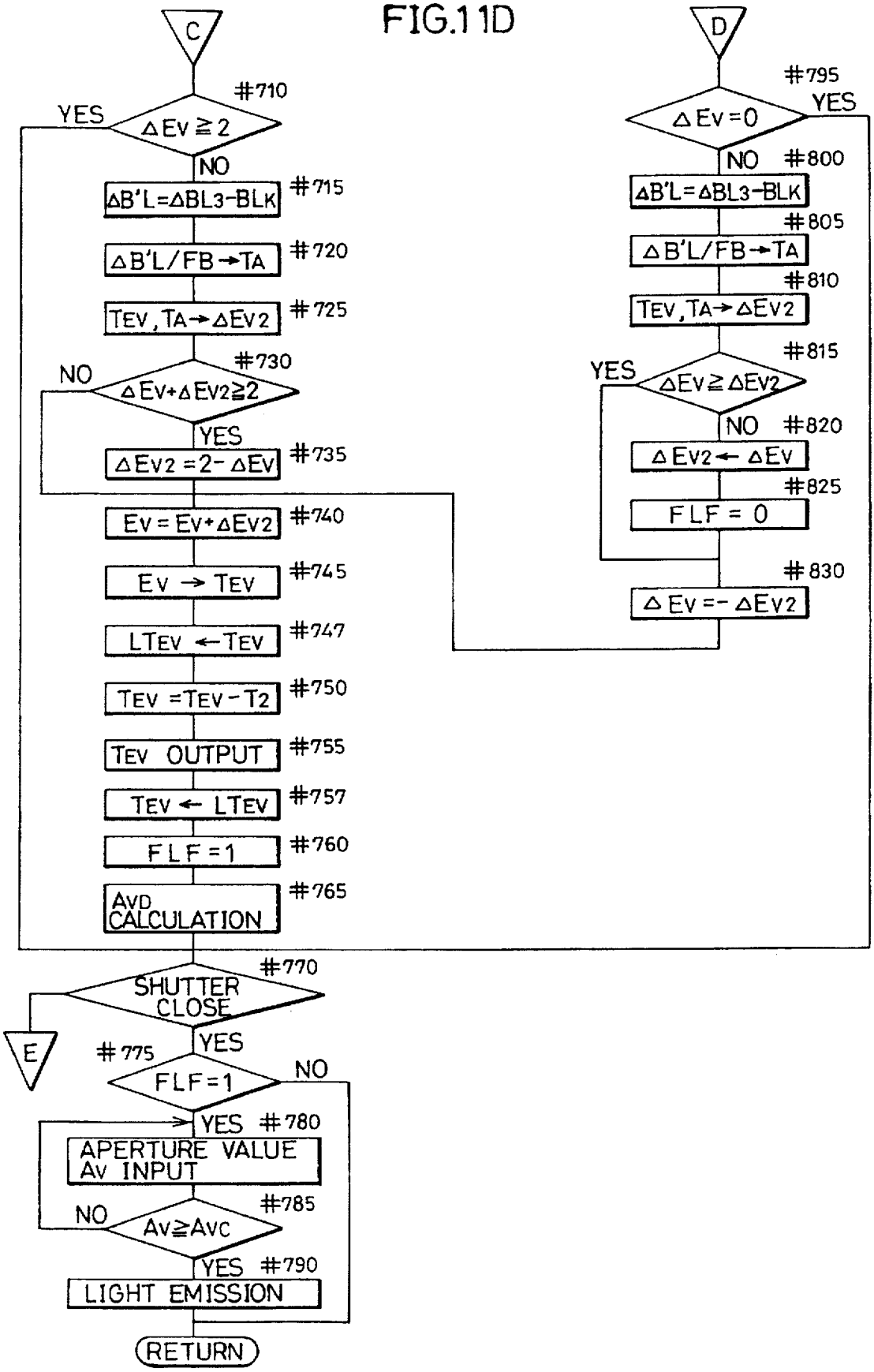

The flow after step #710 will be described referring to FIG. 11C. If $\Delta BL_3 \geqq Bl_K$ is step #705, although control to reduce exposure time should be further performed, when the correction amount $\Delta E_V$ exceeds 2 in step #710, no more correction is performed and the program proceeds to step #770. If $\Delta E_V < 2$ in step #710, a permittable predetermined amount $BL_K$ is subtracted from an actual blurring amount $\Delta BL_3$ to find out the difference $\Delta B'L$, which is divided by the blurring speed FB at that time to obtain $T_A$ (#715, #720). Then an exposure correction amount $\Delta E_V2$ is obtained from an exposure time $T_{EV}$ and TA, and a determination is made as to whether the amount obtained by adding an exposure correction amount $\Delta E_V$ till then and the above $\Delta E_V2$ is 2 or more or not (#730) If it is 2 or more in step #730, determining $\Delta E_V2 = 2—\Delta E_V$ (#735), if it is less than 2, the program skips step #735 and the program proceeds to step #740, respectively (#735).

In step #740, $E_V$–$E_V + \Delta E_V2$, an exposure time $T_{EV}$ is re-obtained from this, and then $T_{EV} = T_2$, and $T_{EV}$ is outputted (#740–#755). A flag FLF indicating flush light emission is set, an aperture value $A_{VD}$ is calculated, and the program proceeds to step #770. In step #770, a determination is made as to whether a shutter closing signal is supplied as an output from exposure control circuit AE (shutter closing operation has already been performed) or not, if a shutter closing signal is not supplied, the program returns to step #615, and the flow after that point is performed. If a closing signal is supplied as an input, the program proceeds to step #775 to determine if a flag FLF is set or not (#775). If flag FLF is set in step #775, an absolute aperture value AV is supplied, $AV \geqq A_{VC}$ or not is determined, and if $AV < A_{VC}$, the program returns to step #780 (#780–#785). On the other hand, when $AV \geqq A_{VC}$ in step #785, a flush light emission signal (terminal EMI) is outputted to flush circuit FL to apply flush light emission and the program returns (#785, #790). When the flag FLF is not set in step #775, the program immediately returns.

If $\Delta Bl_3 < BL_K$ in step #705, the program proceeds to step #795 (FIG. 11C), a determination is first made as to whether the correction exposure amount $\Delta E_V$ is 0 or not, and if it is 0, the program proceeds to step #770 (#795). If $\Delta E_V$ is not 0 in step #795, a permittable correction amount $BL_K$ is subtracted from the blurring amount $\Delta BL_3$, dividing the same by the blurring speed FB at that time to obtain an exposure time TA (#775–#805). Next, an exposure correction amount $\Delta E_V2$ (>0) is obtained from exposure times $T_{EV}$, TA (#810). Next, comparing the exposure correction amount $\Delta E_V$ until the previous time and the above $\Delta E_V2$, if $\Delta E_V \geqq \Delta E_V2$, the program proceeds to step #830. If $\Delta E_V < \Delta E_V2$ in step #815, to make an exposure correction amount 0, it is determined $\Delta E_V \rightarrow \Delta E_V2$, the flush light emission flag FLF is reset, and the program proceeds to step #830 (#815–#825). And then, with $\Delta E_V V = —\Delta E_V2$, the program proceeds to step #740 (#830).

Figure 14A:
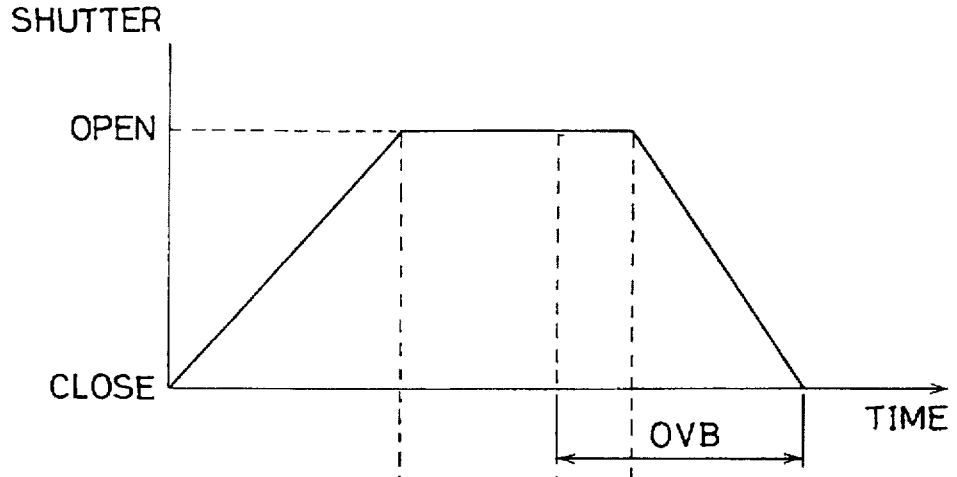
FIGS. 14A and 14B are diagrams for describing the effect in the case where the blurring correcting is possible.
Figure 14B:
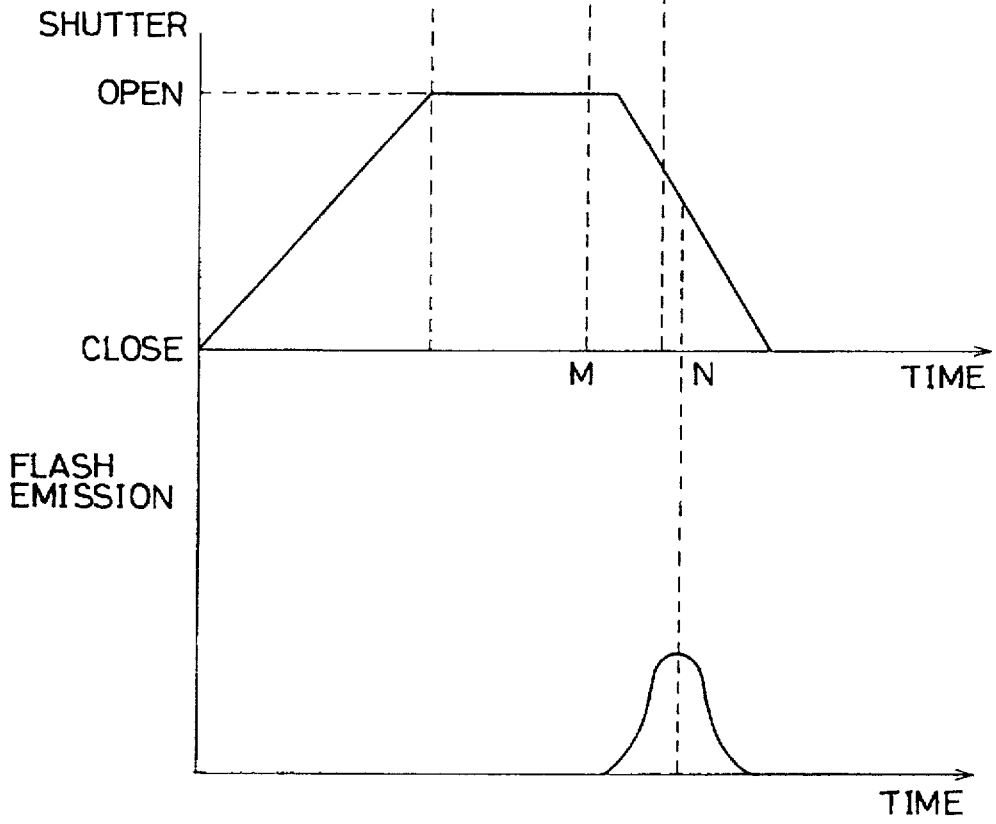

FIGS. 14A and 14B are diagrams showing the relationship between opening/closing of a shutter and time. FIG. 14A is a diagram showing a case of normal blurring correction, and FIG. 14B is a diagram showing the conditions which the present invention is applied to. In each figure, the area in the portion designated by a trapezoid shows an appropriate exposure amount in the case where normal light is employed. Referring to FIG. 14A, when a normal blurring correction is applied, in time from the point M at which the blurring correction is detected to be impossible and to the point of shutter closing, or in the region designated by OVB, the blurring correction could not finnish. As a result, blurring is produced.

Referring to FIG. 14B, when blurring correction according to the present invention is performed, an exposure amount is re-calculated at the point M at which it is detected that blurring correction is impossible, an exposure time TA is obtained, and it shifts to the control for emitting flush light if needed. Here, the control is performed flushmatically. As shown in the figure, the aperture is started to be closed, flush is emitted at the point denoted with N to reduce a blurring amount.

By the control, as compared to the case where flush is emitted from the first point, according to the present invention, a normal light is utilized as much as possible, so that solid and excellent pictures could be taken.

Returning to FIG. 3, if a preparatory switch S1 is OFF in step #25, a determination is made as to whether charging is completed or not, and when the charging is completed, boosting is stopped. In step #40, a determination is made as to whether a power source holding timer $T_1$ has counted 10 seconds or not. If the timer $T_1$ has not counted 10 seconds, the program shifts to step #30 to carry out a determination of S1 ON. If the timer $T_1$ has counted 10 seconds in step #40, a feeding transistor Tr1 is turned off in step #45 to stop supplying power to the first peripheral circuit $CT_1$ including light measuring circuit LM and so forth. In step #50, feeding transistor Tr2 is turned off, power supply to the second peripheral circuit $CT_2$ including angular velocity sensors Sx, Sy is stopped, and the display by the display 55 circuit DISP is totally eliminated in step #55. Then, a flag SI OFF F indicating that the preparatory switch S1 is OFF is set in step #60, and the program performs the flow from #10.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera capable of correcting fluttering of an object image due to camera-shake, comprising:

camera-shake detecting sensor for detecting said camera-shake and for outputting camera-shake information;

taking lens for forming said object image;

correcting means for shifting a position of the object image based on the camera-shake information such that the object image remains stationary during an exposure;

driving means for driving an optical member in said taking lens; and control means for controlling said correcting means so that said correcting means does not use an output of said camera-shake detecting sensor when said optical member is being driven.

2. The camera according to claim 1, wherein said optical member is a focusing lens used for focusing [on] said object image onto a predetermined focal point.

3. The camera according to claim 1, wherein said camera-shake detecting sensor [comprises an acceleration sensor] *includes an angular velocity sensor.*

4. A camera capable of correcting fluttering of an object image due to camera-shake, comprising:

a camera-shake detecting sensor for detecting said camera-shake and for outputting camera-shake information;

correcting means for shifting a position of the object image based on the camera-shake information such that the object image remains stationary during an exposure;

an actuator for performing predetermined operation for photographing;

motor driving means for driving said actuator; and controlling means for forbidding fluttering correction based on camera-shake information obtained during operation of said driving means.

5. The camera according to claim 4, wherein said camera-shake detecting sensor [comprises an acceleration sensor] *includes an angular velocity sensor.*

6. The camera according to claim 5, further comprising:

a focus adjusting optical system used for focusing said object image onto a predetermined focal point; and said actuator driving said focus adjusting optical system.

7. A camera capable of correcting fluctuation of an object image due to camera-shake, comprising:

a power source;

boosting means for boosting said power source voltage;

charge means to be charged with said boosted voltage;

flash means applied with power from said charge means for emitting flashlight;

a sensor supplied with power by said power source for detecting a camera-shake;

correcting means for correcting fluctuation of the object image due to said camera-shake according to the output of said sensor such that the object image remains stationary during an exposure; and controlling means for controlling said correcting means so that correction on the basis of said sensor output provided during operation of said boosting means is not performed.

8. A camera capable of correcting image movement due to camera-shake, comprising:

exposure amount controlling means for controlling exposure to film;

camera-shake detecting sensor for detecting said camera-shake;

correcting means for correcting movement of the object image based on the output of said camera-shake detecting sensor;

determining means for determining whether the movement can be properly corrected or not;

auxiliary light means for lightening said object; and controlling means for making said auxiliary light means emit light when said determining means determines that said movement cannot be properly corrected in exposure.

9. A camera according to claim 8, wherein said determining means comprises a velocity calculating means for calculating velocity of the object image on the basis of said sensor outputs and determines whether said correction is correctly performed or not on the basis of said velocity.

10. A camera according to claim 8, further comprising:

exposure time setting means for setting exposure time; and said determining means determining whether said correction is correctly performed or not on the basis of said exposure time.

11. A camera according to claim 8, further comprising:

exposure time setting means for setting exposure time, and wherein said controlling means changes aid exposure time set by said exposure time setting means into an exposure time shorter than said set exposure time and also makes said auxiliary light means emit light when said determining means determines that said movement cannot be properly corrected in said exposure.

12. A camera capable of correcting an object image due to camera-shake, comprising:

a power source;

a circuit consuming a large amount of power during operation, the voltage of said power source fluctuating due to the consumption;

a sensor supplied with power by said power source for detecting a camera-shake; and correcting means for correcting movement of an object image due to said camera-shake according to the output of said sensor and not to correct on the basis of said sensor output that is provided during operation of said circuit.

13. A camera according to claim 12, wherein said circuit comprises boosting means.

14. Kindly cancel claim 14, without prejudice or disclaimer.

15. A camera comprising:

(a) exposure amount controlling means for controlling exposure of film;

(b) camera-shake detecting sensor for detecting camera-shake amount during exposure operation;

(c) determining means for determining whether amount of fluctuation of an object image due to the camera-shake exceeds a predetermined value or not based on said camera-shake amount;

(d) auxiliary light means for lighting said object; and (e) control means for controlling said auxiliary light means based on the result determined by said determining means.

16. The camera according to claim 15, said camera further comprising:

(f) exposure terminating means for terminating said exposure operation of said exposure amount controlling means when said determining means determines that said amount of fluctuation exceeds said predetermined value.

17. A camera according to claim 16, wherein said control means controls said auxiliary light means to emit light when difference of exposure amount upon termination of exposure by said exposure terminating means from a predetermined exposure amount exceeds a predetermined value.

18. A camera according to claim 16, wherein said control means controls said auxiliary light means to emit light by amount corresponding to the difference between the exposure amount when the exposure is terminated by said exposure terminating means and a prescribed exposure amount.

19. A camera comprising:

(a) exposure amount controlling means for controlling exposure to film;

(b) camera-shake detecting sensor for detecting said camera-shake amount during exposure operation;

(c) determining means for determining whether amount of fluctuation of an object image exceeds a predetermined value or not based on aid camera-shake amount; and (d) control means for terminating exposure operation of said exposure amount controlling means when said determining means determines that the fluctuation amount exceeds a predetermined value.

20. A camera according to claim 19, further comprising:

(e) auxiliary light means for lighting said object; and wherein said control means controls said auxiliary light means to emit light when difference of exposure amount upon termination of exposure by said exposure terminating means from a predetermined exposure amount exceeds a predetermined value.

21. The cameras according to claim 9, further comprising:

(f) auxiliary light means for lighting said object; and wherein said control means controls said auxiliary light means to emit light by amount corresponding to the difference between exposure amount when the exposure is terminated by said control means and a prescribed exposure amount.

*22. A camera capable of detecting fluttering of an object image due to camera-shake, comprising:*

*a camera-shake detecting sensor for detecting camera-shake and for outputting camera-shake information;*

*a taking lens for forming said object image;*

*a driving device for driving an optical member in said taking lens; and*

*a control device for controlling a predetermined operation of the camera based on the camera-shake information, wherein said control device does not use the camera-shake information when said optical member is being driven.*

*23. The camera according to claim 22, wherein said control device includes a correcting device for shifting a position of the object image based on the camera-shake information such that the object image remains stationary during an exposure, and does not use the camera-shake information for correcting the position of the object image when said optical member is being driven.*

*24. The camera according to claim 23, wherein said correcting device uses the camera-shake information after the driving of the optical member has been completed.*

*25. The camera according to claim 22, wherein said optical member is a focusing lens used for focusing said object image onto a predetermined focal point.*

*26. The camera according to claim 22, wherein said camera-shake detecting sensor includes an angular velocity sensor.*

*27. A camera capable of detecting fluttering of an object image due to camera-shake, comprising:*

*a camera-shake detecting sensor for detecting said camera-shake and for outputting camera-shake information;*

*an actuator for performing a first predetermined operation for photographing;*

*a motor driving device for driving said actuator;*

*a control device for controlling a second predetermined operation for photographing, which is different from said first predetermined operation, based on the camera-shake information; and*

*an inhibiting device for inhibiting control of said second predetermined operation based on camera-shake information that is obtained while said actuator is being driven by said driving device.*

*28. The camera according to claim 27, wherein said control device includes a correcting device for shifting a position of the object image based on the camera-shake information such that the object image remains stationary during an exposure, and said inhibiting device inhibits fluttering correction based on camera-shake information that is obtained while said actuator is being driven.*

*29. The camera according to claim 27, further comprising:*

*a focus adjusting optical system used for focusing said object image onto a predetermined focal point; and wherein said actuator drives said focus adjusting optical system.*

*30. The camera according to claim 27, wherein said camera-shake detecting sensor includes an angular velocity sensor.*

*31. A camera capable of detecting fluctuation of an object image due to camera-shake, comprising:*

*a power source;*

*a boosting device for boosting said power source voltage;*

*a charge device to be charged with said boosted voltage;*

*a flash device applied with power from said charge device for emitting flash light;*

*a sensor supplied with power from said charge device for detecting camera-shake; and*

*a control device for controlling a predetermined operation of the camera based on an output of said sensor, wherein said control device does not use the output of*

*said sensor when said boosting device is boosting said power source voltage.*

*32. The camera according to claim 31, wherein said control device includes a correcting device for correcting fluctuation of the object image due to said camera-shake based on the output of said sensor such that the object image remains stationary during an exposure, and does not use the output of said sensor for the fluctuation correcting when said boosting device is boosting said power source voltage.*

*33. The camera according to claim 31, wherein said control device includes a display device for displaying information based on the output of said sensor, and does not use the output of said sensor for the displaying operation when said boosting device is boosting said power source voltage.*

*34. The camera according to claim 31, wherein said sensor includes an angular velocity sensor.*

*35. A camera capable of detecting movement of an object image due to camera-shake, comprising:*

*a power source;*

*a circuit consuming a large amount of power during operation, the voltage of said power source fluctuating due to the consumption;*

*a sensor supplied with power by said power source for detecting camera-shake; and*

*a control device for controlling a predetermined operation of the camera based on output of said sensor, wherein said control device does not use the output of said sensor when said circuit is operating.*

*36. The camera according to claim 35, wherein said control device includes a correcting device for correcting movement of the object image due to said camera-shake based on the output of said sensor such that the object image remains stationary during an exposure, and does not use the output of said sensor for the movement correcting when said circuit is operating.*

*37. The camera according to claim 35, wherein said circuit includes boosting device.*

*38. A camera capable of detecting fluctuation of an object image due to camera-shake, comprising:*

*a power source;*

*a boosting device for boosting said power source voltage;*

*a charge device to be charged with said boosted voltage;*

*a flash device applied with power from said charge device for emitting flash light;*

*a detecting device supplied with power from said charge device for detecting camera-shake; and*

*a control device for controlling said boosting device and detecting device so that a boosting operation and a detecting operation are not conducted at the same time.*

*39. The camera according to claim 38, further comprising:*

*a display device for displaying information based on the output of said detecting device, wherein*

*said control device controls said boosting device and display device so that a boosting operation and a displaying operation are not conducted at the same time.*

*40. The camera according to claim 38, further comprising:*

*a charge complete detecting device for detecting that said charge device is charged to a predetermined level, wherein*

*said control device controls said camera-shake detecting device so as to detect camera-shake after the charging operation is completed.*

*41. A camera capable of correcting movement of an object image due to camera-shake, comprising:*

*a first operating member which is to be operated by a user;*

*a detecting device, which works in response to an operation of said first operating member, for detecting camera-shake;*

*a display device, which works in response to the operation of said first operating member, for displaying information based on the detected camera-shake;*

*a second operating member which is to be operated successively after said first operating member by the user;*

*an exposure control device, which works in response to the operation of said second operating member, for controlling an exposure for photographing; and*

*a correcting device, which works in response to the operation of said second operating member, for correcting movement of the object image due to said camera-shake based on the detected camera-shake such that the object image remains stationary during an exposure.*

*42. The camera according to claim 41, wherein said first operating member is a switch which is turned on by a half depression of a release button of the camera, and said second operating member is a switch which is turned on by a complete depression of the release button.*

*43. A camera capable of detecting movement of an object image due to camera-shake, comprising:*

*a manual operating member which is to be operated by a user;*

*a distance measuring device for measuring a distance to the object;*

*a detecting device for detecting camera-shake;*

*a first control device for controlling said distance measuring device so as to start the distance measurement in response to the operation of said manual operating member and to conduct the distance measurement only once during the operation of said manual operating member; and*

*a second control device for controlling said detecting device so as to start the camera-shake detection in response to the operation of said manual operating member and to repeat the camera-shake detection during the operation of said manual operating member.*

*44. The camera according to claim 43, further comprising:*

*a light measuring device for measuring brightness of the object; and*

*a third control device for controlling said light measuring device so as to start the light measurement in response to the operation of said manual operating member and to conduct the light measurement only once during the operation of said manual operating member.*

*45. The camera according to claim 43, wherein said manual operating member is a switch which is turned on by a half depression of a release button of the camera.*

*46. The camera according to claim 43, further comprising:*

*a lens shutter which works not only as a shutter but as an aperture stop.*

* * * * *

UNITED STATES PATENT AND TRADEMARK OFFICE

CERTIFICATE OF CORRECTION

PATENT NO. : RE 35,583
DATED : August 12, 1997
INVENTOR(S) : Masataka Hamada et al.

It is certified that error appears in the above-identified patent and that said Letters Patent is hereby corrected as shown below:

Title page,
Below the title insert:

-- Notice: More than one reissue application has been filed for the reissue of patent 5,210,563. The reissue applications are 08/439,183, which is a Reissue of 5,210,563, and 08/801,134, which is a division of 08/439,183. --

Signed and Sealed this

Fifteenth Day of April, 2003

JAMES E. ROGAN
*Director of the United States Patent and Trademark Office*